(12) United States Patent
Laycock et al.

(10) Patent No.: US 8,584,030 B2
(45) Date of Patent: Nov. 12, 2013

(54) SYSTEMS AND METHODS FOR DISPLAYING HVAC INFORMATION

(75) Inventors: Graeme Laycock, Sydney (AU); Laura Smith, San Francisco, CA (US)

(73) Assignee: Honeywell International Inc., Morristown, NJ (US)

( * ) Notice: Subject to any disclaimer, the term of this patent is extended or adjusted under 35 U.S.C. 154(b) by 408 days.

(21) Appl. No.: 12/891,529

(22) Filed: Sep. 27, 2010

(65) Prior Publication Data

US 2011/0083094 A1    Apr. 7, 2011

(30) Foreign Application Priority Data

Sep. 29, 2009   (AU) ................................ 2009904740

(51) Int. Cl.
*G06F 3/048*          (2013.01)
(52) U.S. Cl.
USPC .......................................... 715/772; 715/970
(58) Field of Classification Search
USPC .................. 715/771, 772, 970; 700/276–278, 700/299–300; 165/201; 236/1 C
See application file for complete search history.

(56) References Cited

U.S. PATENT DOCUMENTS

| | | | |
|---|---|---|---|
| 4,918,615 A | | 4/1990 | Suzuki et al. |
| 5,636,350 A | * | 6/1997 | Eick et al. ..................... 345/440 |
| 5,745,126 A | | 4/1998 | Jain et al. |
| 5,751,916 A | | 5/1998 | Kon et al. |
| 6,065,842 A | | 5/2000 | Fink |
| 6,139,177 A | | 10/2000 | Venkatraman et al. |
| 6,157,943 A | * | 12/2000 | Meyer ........................... 709/203 |
| 6,229,429 B1 | | 5/2001 | Horon |
| 6,334,211 B1 | | 12/2001 | Kojima et al. |
| 6,353,853 B1 | | 3/2002 | Gravlin |
| 6,369,695 B1 | | 4/2002 | Horon |
| 6,487,457 B1 | | 11/2002 | Hull et al. |
| 6,580,950 B1 | | 6/2003 | Johnson et al. |

(Continued)

FOREIGN PATENT DOCUMENTS

| | | |
|---|---|---|
| CA | 2538139 | 10/2005 |
| EP | 1669912 | 6/2006 |

(Continued)

OTHER PUBLICATIONS

Andover Controls, Network News, vol. 2, No. 2, 8 pages, 1997.

(Continued)

*Primary Examiner* — Omar Abdul-Ali
*Assistant Examiner* — Anil Bhargava
(74) *Attorney, Agent, or Firm* — Seager Tufte & Wickhem LLC.

(57) ABSTRACT

Described herein are systems and methods for displaying HVAC information. One embodiment provides a method for displaying HVAC information including obtaining data indicative of a plurality of HVAC components of an HVAC system. For example, this data may be maintained by a building management system. The method further includes defining data indicative of a display object for rendering on a client display, the display object including a plurality of geometrically arranged indicator blocks, wherein each indicator block is associated with a respective HVAC component. For the purposes of this display object, each indicator block is bound with respective source of comfort level data for its associated HVAC component. Display characteristics are defined for each indicator block responsive to the comfort level data. The display characteristics are selectively modified responsive to changes in the comfort level data. The resulting display object is referred to as a "comfort map" for the present purposes.

16 Claims, 4 Drawing Sheets

(56) References Cited

U.S. PATENT DOCUMENTS

| | | |
|---|---|---|
| 6,598,056 B1 | 7/2003 | Hull et al. |
| 6,619,555 B2 | 9/2003 | Rosen |
| 6,741,915 B2 | 5/2004 | Poth |
| 6,796,896 B2 | 9/2004 | Laiti |
| 6,816,878 B1 | 11/2004 | Zimmers et al. |
| 6,876,951 B2 | 4/2005 | Skidmore et al. |
| 6,904,385 B1* | 6/2005 | Budike, Jr. .................. 702/182 |
| 6,993,417 B2 | 1/2006 | Osann, Jr. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,308,388 B2 | 12/2007 | Beverina et al. |
| 7,346,433 B2 | 3/2008 | Budike, Jr. |
| 7,383,148 B2 | 6/2008 | Ahmed |
| 7,434,742 B2 | 10/2008 | Mueller et al. |
| 7,512,450 B2 | 3/2009 | Ahmed |
| 7,516,490 B2 | 4/2009 | Riordan et al. |
| 7,548,833 B2* | 6/2009 | Ahmed .................. 702/188 |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,702,421 B2* | 4/2010 | Sullivan et al. .............. 700/276 |
| 7,774,227 B2 | 8/2010 | Srivastava |
| 7,797,188 B2 | 9/2010 | Srivastava |
| 7,856,370 B2 | 12/2010 | Katta et al. |
| 8,086,047 B2 | 12/2011 | Penke et al. |
| 2002/0111698 A1 | 8/2002 | Graziano et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0064260 A1 | 4/2004 | Padmanabhan et al. |
| 2004/0143474 A1 | 7/2004 | Haeberle et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0029256 A1 | 2/2006 | Miyoshi et al. |
| 2006/0058900 A1 | 3/2006 | Johanson et al. |
| 2006/0077255 A1 | 4/2006 | Cheng |
| 2006/0265664 A1* | 11/2006 | Simons et al. ................. 715/772 |
| 2006/0279630 A1 | 12/2006 | Aggarwal et al. |
| 2007/0016955 A1 | 1/2007 | Goldberg et al. |
| 2007/0114295 A1 | 5/2007 | Jenkins |
| 2007/0219645 A1* | 9/2007 | Thomas et al. ................. 700/29 |
| 2008/0036593 A1 | 2/2008 | Rose-Pehrsson et al. |
| 2008/0062167 A1 | 3/2008 | Boggs et al. |
| 2008/0144885 A1 | 6/2008 | Zucherman et al. |
| 2008/0198231 A1 | 8/2008 | Ozdemir et al. |
| 2008/0224862 A1 | 9/2008 | Cirker |
| 2008/0320552 A1 | 12/2008 | Kumar et al. |
| 2009/0057427 A1* | 3/2009 | Geadelmann et al. .......... 236/51 |
| 2009/0157744 A1 | 6/2009 | McConnell |
| 2009/0160673 A1 | 6/2009 | Cirker |
| 2009/0210813 A1* | 8/2009 | Sawczak et al. .............. 715/771 |
| 2010/0048167 A1 | 2/2010 | Chow et al. |
| 2010/0070089 A1* | 3/2010 | Harrod et al. .................. 700/277 |
| 2010/0070907 A1* | 3/2010 | Harrod et al. .................. 715/772 |
| 2010/0156628 A1 | 6/2010 | Ainsbury et al. |
| 2010/0156630 A1 | 6/2010 | Ainsbury |
| 2010/0235004 A1* | 9/2010 | Thind .......................... 700/277 |
| 2011/0077754 A1 | 3/2011 | Jones et al. |
| 2011/0077779 A1 | 3/2011 | Fuller et al. |
| 2011/0083094 A1 | 4/2011 | Laycock et al. |

FOREIGN PATENT DOCUMENTS

| | | |
|---|---|---|
| JP | 7085166 | 3/1995 |
| JP | 11024735 | 1/1999 |
| JP | 11317936 | 11/1999 |
| JP | 2001356813 | 12/2001 |
| JP | 2005242531 | 9/2005 |
| JP | 2005311563 | 11/2005 |
| WO | 9621264 | 7/1996 |
| WO | 2004029518 | 4/2004 |
| WO | 2005045715 | 5/2005 |
| WO | 2008157755 | 12/2008 |
| WO | 2009079648 | 6/2009 |
| WO | 2010106474 | 9/2010 |

OTHER PUBLICATIONS

Andover Controls, World, 4 pages, Spring 1997.

CADGRAPHICS, "The CADGRAPHICS User's Guide," 198 pages, 2003.

Carrier Comfort Network CCN Web, "Web Browser User Interface to the Carrier Comfort Network," 2 pages, 2002.

Carrier Comfort Network CCN Web, Overview and Configuration Manual, 134 pages, Apr. 2006.

Carrier Comfort Network CCN Web, Product Data, 2 pages, Apr. 2006.

Carrier, "i-Vu Powerful and Intuitive Front End for Building Control," 2 pages, Aug. 2005.

Carrier, "i-Vu Web-Based Integrated Control System," 3 pages, 2005.

Carrier, Demo Screen Shots, 15 pages, prior to Aug. 27, 2007.

Carrier, i-Vu CCN 4.0, Owner's Guide, 20 pages, Jul. 2007.

Carrier, i-Vu CCN, 7 pages, 2007.

Circon, "i-Browse Web-Based Monitoring and Control for Facility Management," 2 pages, prior to Aug. 27, 2007.

Echelon, "Energy Control Solutions with the i.Lon SmartServer," 4 pages, 2007.

Echelon, "i.Lon 100e3 Internet Server Models 72101R-300, 72101R-308, 72102R-300, 72103-R300 . . . " 5 pages, copyright 2002-2007.

Echelon, "i.Lon 100e3 Internet Server New Features," 15 pages, Sep. 2006.

Echelon, "i.Lon SmartServer," 5 pages, 2007.

Honeywell News Release, "Honeywell's New Sysnet Facilities Integration System for Boiler Plant and Combustion Safety Processes," 4 pages, Dec. 15, 1995.

Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.

Honeywell, Excel 15B W7760B Building Manager Release 2.02.00, Installation Instructions, 28 pages, Dec. 2004.

Honeywell, The RapidZone Solution, Excel 5000 Open System, Application Guide, 52 pages, Jan. 2004.

http://pueblo.lbl.gov/~olken . . . , "Remote Building Monitoring and Operations Home Page," 5 pages, prior to Aug. 27, 2007.

http://www.commercial.carrier.com/commercial/hvac/productdescription . . . , "Carrier: i-Vu CCN," 1 page, printed Mar. 11, 2008.

http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.

http://www.docs.hvacpartners.com/idc/groups/public/documents/techlit/gs-controls-ivuccn.rtf, "Products," 5 pages, printed Jul. 3, 2007.

http://www.lightstat.com/products/istat.asp, Lightstat Incorporated, "Internet Programmable Communicating Thermostats," 1 page, printed Mar. 13, 2007.

(56) References Cited

OTHER PUBLICATIONS http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights on a Wireless Lighting Control System," 11 pages, printed Mar. 22, 2007.
i.Lon 100e3 Internet Server, 1 page, prior to Aug. 27, 2007.
i.Lon, SmartServer, 2 pages, prior to Aug. 27, 2007.
i-stat, Demo Screen Shots, 9 pages, printed Mar. 13, 2007.
i-stat, The Internet Programmable Thermostat, 2 pages, prior to Aug. 27, 2007.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.
Published Australian Application 2009904740, 28 pages, Application Filed Sep. 29, 2009.
U.S. Appl. No. 13/086,255, 27 pages, submitted May 11, 2012.

\* cited by examiner

SYSTEMS AND METHODS FOR DISPLAYING HVAC INFORMATION

This application claims the benefit of Australian Provisional Patent Application No. 2009904740, filed Sep. 29, 2009, and entitled "SYSTEMS AND METHODS FOR DISPLAYING HVAC INFORMATION," which is hereby incorporated by reference.

FIELD OF THE INVENTION

The present invention relates broadly to building management, and more particularly to systems and methods for displaying HVAC information. Embodiments of the invention have been particularly developed for providing an automated visualization indicative of the overall status of an HVAC system, referred to herein as a comfort map, and additionally to streamline the manner in which applications are designed. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

Present day Heaving Ventilation and Air Conditioning (HVAC) operational control displays are not ideal in terms of effectively communicating to an operator the status of a building's HVAC system.

Creating HVAC operational visual displays is a manual process. Operational displays associated with monitoring and managing HVAC operational characteristics are typically associated with building floor plans. For example, a HVAC operational display may be based on an AutoCAD floorplan with the added functionality that layers change color over time to indicate if an area is within a designated temperature range. This association of temperature monitoring to floorplans results in a unique set of visual operational displays being required for every building. These displays need to be manually created by Graphics Engineers with specialized skills. As buildings change over time, Graphic Engineers need to be re-engaged if these displays are to be updated. In many instances, the quality of these displays degrades as the building is renovated and floorplans change. Many buildings may not have access to the appropriate updated.

It follows that there is a need in the art for improved systems and methods for displaying HVAC information.

SUMMARY

It is an object of the present invention to overcome or ameliorate at least one of the disadvantages of the prior art, or to provide a useful alternative.

One embodiment provides a method for displaying HVAC information, the method including;

obtaining data indicative of a plurality of HVAC components of an HVAC system;

defining data indicative of a display object for rendering on a client display, the display object including a plurality of geometrically arranged indicator blocks, wherein each indicator block is associated with a respective HVAC component;

binding each indicator block with a respective source of comfort level data for its associated HVAC component; and for each indicator block, defining display characteristics responsive to the comfort level data, and selectively modifying the display characteristics responsive to changes in the comfort level data.

One embodiment provides a method wherein the plurality of HVAC components include a plurality of Air Terminal Units (ATUs).

One embodiment provides a method wherein each indicator block is associated with a respective ATU.

One embodiment provides a method wherein each HVAC component has an assigned comfort setpoint, and wherein the defining of display characteristics responsive to the comfort level data includes a step of analysing the comfort level data based on the comfort setpoint.

One embodiment provides a method wherein the display characteristics visually indicate whether a region serviced by the relevant HVAC component satisfies predefined comfort parameters.

One embodiment provides a method wherein the display characteristics visually indicate a relationship between the comfort level data for the relevant HVAC component and a comfort level setpoint for the relevant HVAC component.

One embodiment provides a method wherein the display characteristics include the colour of the indicator block.

One embodiment provides a method wherein the display component is sized responsive to the number of HVAC components.

One embodiment provides a method wherein the indicator blocks are quadrangular.

One embodiment provides a method wherein the indicator blocks are arranged as a grid.

One embodiment provides a method wherein rows in the grid represent a first HVAC system attribute and columns in the grid represent a second HVAC system attribute.

One embodiment provides a method wherein a given indicator block, when rendered on a client display, provides an interactive object for accessing additional information describing its associated HVAC component.

One embodiment provides a method wherein the source of comfort level data is a data reference in a building management system.

One embodiment provides a method wherein the data reference is indicative of a value derived from analysis of one or more point values associated with the relevant HVAC component.

One embodiment provides a method wherein the source of comfort level data is an HVAC component.

One embodiment provides a method wherein the comfort level data is derived from one or more parameters including temperature data.

One embodiment provides a method wherein the one or more parameters additionally include humidity data.

One embodiment provides a hardware component configured device configured to perform a method as described herein.

One embodiment provides a computer program product configured device configured to perform a method as described herein.

One embodiment provides a carrier medium carrying computer executable code that, when executed on one or more processors, cause the performance of a method as described herein.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for displaying HVAC information. One embodiment provides a method for displaying HVAC information including obtaining data indicative of a plurality of HVAC components of an HVAC system. For example, this data may be maintained by a building management system. The method further includes defining data indicative of a display object for rendering at a client terminal (for example on a client display), the display object including a plurality of geometrically arranged indicator blocks, wherein each indicator block is associated with a respective HVAC component. For the purposes of this display object, each indicator block is bound with respective source of comfort level data for its associated HVAC component. Display characteristics are defined for each indicator block responsive to the comfort level data. The display characteristics are selectively modified responsive to changes in the comfort level data. The resulting display object is referred to as a "comfort map" for the present purposes.

System Level Overview

Figure 1:
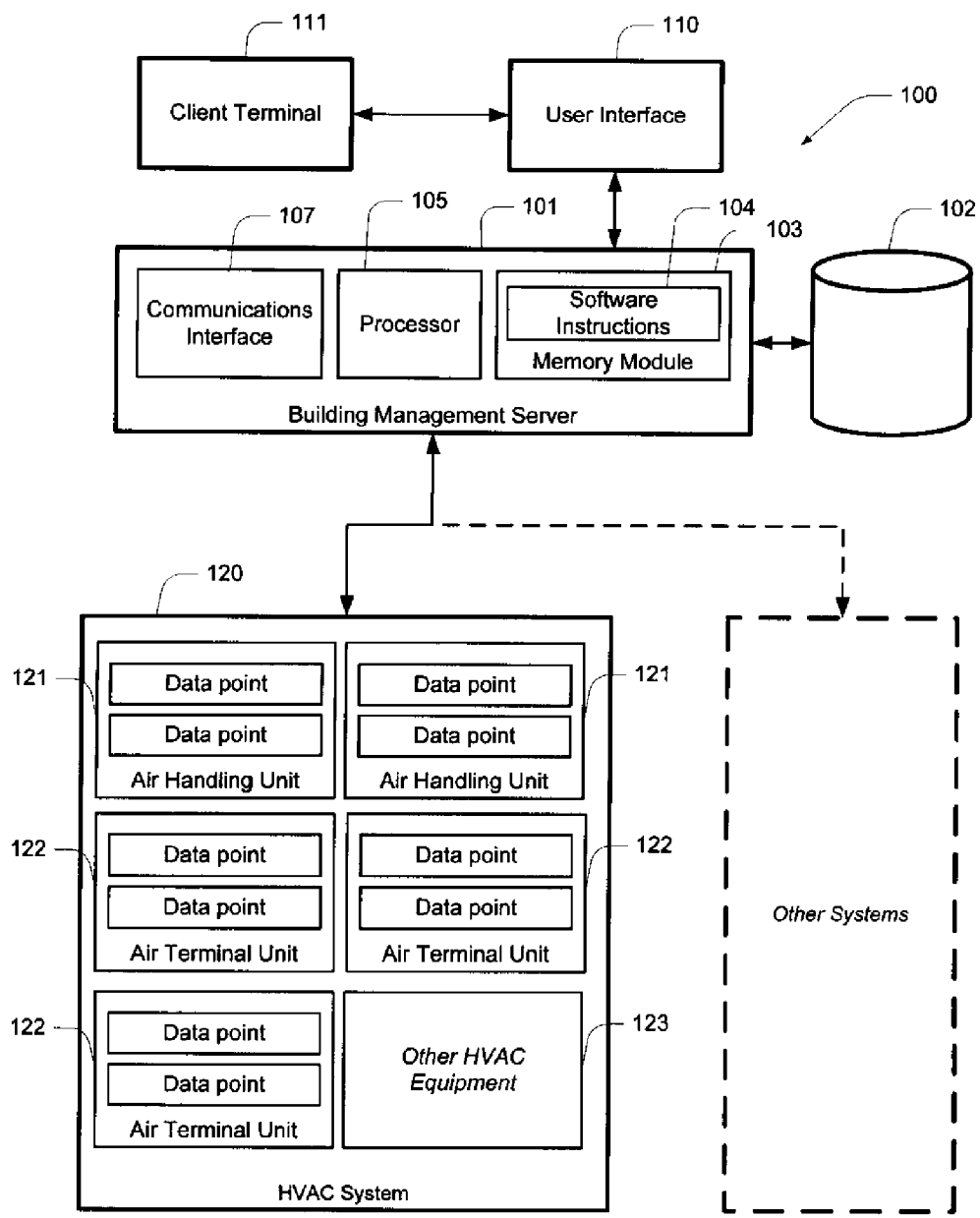
FIG. 1 schematically illustrates a system according to one embodiment.

FIG. 1 illustrates a BMS 100 according to one embodiment. It will be appreciated that this is a relative simplistic schematic illustration, intended to illustrate some key features and functionalities.

BMS 100 is defined by both hardware and software components. For example, BMS 100 includes a central BMS server 101 which operates in conjunction with a database 102. Server 101 includes a memory module 103 which maintains software instructions 104 executable on a processor 105, thereby to allow the server to perform various BMS functionalities. For example, these software instructions define some or all of a computer program product in the form of a BMS software application. BMS 101 includes communication interfaces 107 (such as Ethernet and other interfaces) for enabling communication with a plurality of building components, and with client terminals.

Although FIG. 1 illustrates server 101 as a single component, in some embodiments server 101 is defined by a plurality of distributed hardware and/or software components. Furthermore, various other IT components (such as routers, switches, etc) are omitted for the sake of simplicity.

Server 101 provides a user interface 110. In the present embodiment, a human user interacts with the user interface via a client terminal 111. For example, module 110 is presented as a web-based interface by server 101, and a user of client terminal 111 accesses this interface using a web-browser application. In other embodiments proprietary software is locally installed at client terminal 111. A key point is that software instructions 104 allow user interface 110 to deliver to terminal 111 display data for rendering at terminal 111, and other data associated with this display data. In this manner, terminal 111 is able to render on-screen display objects defined by BMS 101. On such display object is a "comfort map", as discussed herein.

In the present example, HVAC system 120 includes various pieces of equipment, including air handling units 121 and air terminal units 122, and other pieces of equipment 123. Each piece of equipment includes (or is at a practical level related to) none or more data points. These data points are individual inputs and outputs (binary and/or digital) which feed data values into BMS 100. It will be appreciated that the manner by which HVAC system 120 is illustrated is conceptual only.

From a terminology (and practical) perspective, an Air Handling Unit (AHU) is a device used to condition and circulate air as part of a HVAC system. The term "unitary HVAC equipment" describes a piece of HVAC equipment that is usually distributed away from larger centrally located HVAC equipment, and provides localized control of air delivery for a HVAC comfort zone. Examples include a VAV terminal unit (variable air volume terminal unit—a piece of unitary HVAC equipment where air supply is controlled (typically) by a mechanical baffle) or a FCU (Fan Coil Unit—a piece of unitary HVAC equipment where a fan blows air through a heating (sometimes cooling) coil). The term ATU is used herein to describe an Air Terminal Unit, being a generic name for unitary HVAC equipment that controls the final delivery of air to a HVAC controlled zone (such as a VAV terminal unit, or FCU). An AHU system is comprised of one AHU and zero or more physically linked ATUs.

Comfort Map Generation

Figure 2:
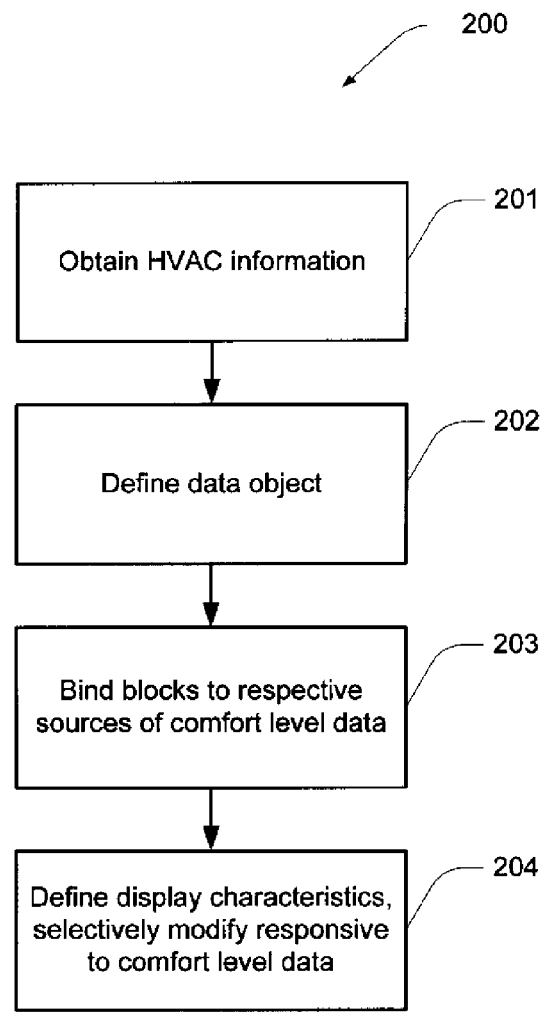
FIG. 2 schematically illustrates a method according to one embodiment.

FIG. 2 illustrates a method 200 according to one embodiment. This method relates to the generation of a comfort map for display at a client terminal (such as client terminal 111), thereby to provide a user of that terminal with a visual overview of the status of an HVAC system. The method is presently carries out in BMS 100, based on software instructions 104 and data maintained in database 102.

Block 201 represents a process including obtaining data indicative of a plurality of HVAC components of an HVAC system. In some embodiments this includes querying database 102 to identify the number of HVAC components that are to be displayed in the comfort map. This assists in sizing the comfort map responsive to the number of components in the relevant building, noting that there may be anywhere from a small number to hundreds or thousands of HVAC components.

Block 202 represents a process including defining data indicative of a display object for rendering on client display 111, this display object presently taking the form of a comfort map. The comfort map, when rendered, includes a plurality of geometrically arranged indicator blocks. Each indicator block is associated with a respective HVAC component. In the present embodiments each indicator block is associated with a respective ATU (such as a VAV terminal unit, or FCU). The display component is sized responsive to the number of HVAC components. For example, the sizing is based on the number of indicator blocks to be contained in the comfort map and screen area constraints (for example a predefined on-screen size of the comfort map).

Block 203 represents a process including binding each indicator block with a respective source of comfort level data for its associated HVAC component. The manner of binding varies between embodiments. In some cases the indicators are bound to data references in database 102 of a building management system 101. This data reference is indicative of a value derived from analysis of one or more point values (i.e. values provided by a digital, binary or analogue output sensor in the HVAC system) associated with the relevant HVAC component, optionally on the basis of a comfort setpoint as discussed below. In other embodiments the indicators are bound more directly to point values associated with HVAC components.

In some embodiments the comfort value for a given ATU is determined centrally at BMS server 101 by analysis of point values associated with that ATU and optionally data maintained in database 102. In other embodiments, an ATU or component associated with an ATU is configured for communicating the comfort value to BMS server 101 (for example the ATU maintains data indicative of its comfort setpoint).

Block 204 represents a process including, for each indicator block, defining display characteristics responsive to the comfort level data. In this manner, each indicator block has defined for it display characteristics based on the comfort level data. The binding allows the display characteristics to be selectively modified responsive to changes in the comfort level data.

In the present embodiments, the display characteristics visually indicate whether a region serviced by the relevant HVAC component satisfies predefined comfort parameters. For example, they indicate whether a region is warmer or cooler than the predefined comfort parameters. Although the present embodiments focus primarily on temperature, this is for the sake of simplicity only. At a more general level, the comfort level data is derived from one or more parameters including temperature data, and optionally other parameters. Other parameters may include humidity, season, and the like, thereby to provide a more advanced measurement of comfort.

In terms of satisfying the predefined comport parameters, the present embodiments make use of comfort setpoints. In overview, each HVAC component has an assigned comfort setpoint, and the defining of display characteristics responsive to the comfort level data includes a step of analysing the comfort level data based on the comfort setpoint. For example, this may include:

Receiving comfort level data, and determining a relationship between this data and the comfort level setpoint. For example, this relationship may indicate that the relevant region is warmer or cooler than identified by the setpoint.

Receiving comfort level data that is inherently indicative of a relationship with the setpoint. For example, the comfort level data may indicate that the relevant region is warmer or cooler than identified by the setpoint.

The nature of the display characteristics varies between embodiments, with some embodiments making use of indicator block colors for representing comfort levels associated with each ATU in the HVAC system.

As noted, the binding allows the display characteristics to be selectively modified responsive to changes in the comfort level data. In this manner, when rendered on a client display, the comfort map indicates current (or substantially current) display characteristics for each indicator block, allowing a user to assess the performance of an HVAC system substantially in real time. In effect, the color of a given indicator block changes from a default value to indicate that the comfort value of the ATU associated with that indicator block deviates from its assigned comfort setpoint.

Exemplary Comfort Map Screenshot

Figure 3A:
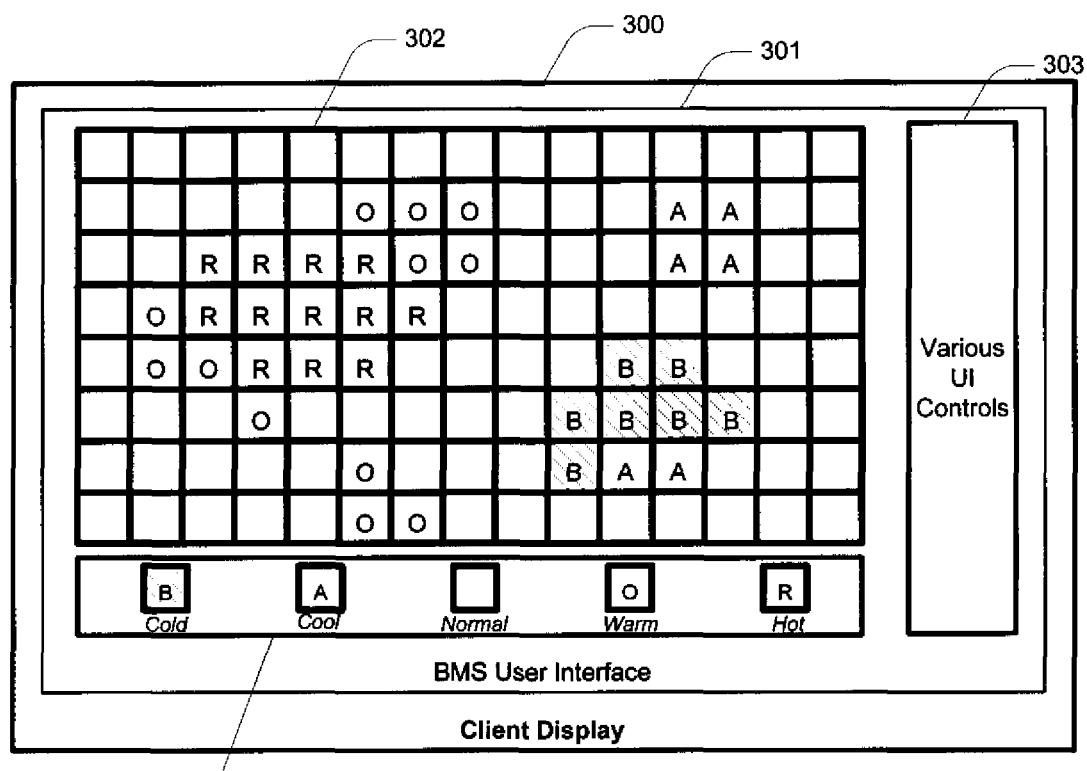
FIG. 3A schematically illustrates a screenshot showing a comfort map according to one embodiment.

FIG. 3A illustrates an exemplary comfort map according to one embodiment. This example should not be regarded as necessarily limiting in any way. This figure shows an exemplary screenshot on a client display 300, such as a monitor coupled to a PC or the like.

Display 300 provides a graphical representation of a BMS user interface 301. This user interface includes a comfort map 302, various UI controls 303, and a comfort map key 304.

Comfort map 302 includes a plurality of square indicator blocks arranged as a grid. However in other embodiments alternate shapes (including quadrangular and non-quadrangular shapes) are used, optionally in alternate configurations. Rows in the grid represent a first HVAC system attribute and columns in the grid represent a second HVAC system attribute. For example, in one embodiment a default layout is for rows to indicate floors in a building, and for columns to represent an attribute such as a numerical identifier.

Attributes used for the purposes of comfort map layout are optionally derived from database 102, which may include model data including a facility model and/or equipment model as described further below. For example, database 102 in some cases maintains data for describing individual HVAC components to be described in terms of location, type, name and data points.

In some embodiments BMS 101 allows a user to create custom layouts, for example by "dragging and dropping" indicator blocks. It will be appreciated that the layout of comfort map 302 will affect patterns that are noticed in various operational scenarios.

In the present example, each indicator block is colored to indicate the comfort value of its associated ATU. In the context of FIG. 3A, blank blocks are used to indicate a default color, blocks containing the letter "R" represent red blocks, blocks containing the letter "O" represent orange blocks, blocks containing the letter "A" represent aqua blocks, blocks containing the letter "B" represent blue blocks. These color selections are used as a generic representation of temperature, with default representing a comfort value of "normal", orange representing a comfort value of "warm", red representing a comfort value of "hot", aqua representing a comfort value of "cool", and blue representing a comfort value of "cold". This context is presently provided graphically via comfort map key 304.

Even where a relatively straightforward layout is used (for example based on floors and unit names), patterns are able to be recognized, these providing a general overview as to the operation of an HVAC system (for example in terms of warm or cool regions).

Additional Comfort Map Functionalities

Various additional functionalities are optionally incorporated into the present comfort map technologies. Some of these are discussed below.

In some embodiments, a given indicator block, when rendered on a client display, provides an interactive object for accessing additional information describing its associated HVAC component. For example, when a user places a cursor over a given block (or in some cases clicks on that block) interface 301 provides additional data regarding the relevant HVAC component. This additional data may include the likes of the location, name, current point value or point values, setpoint, and so on. The nature of information available will be dependent on the configuration of BMS 100, and more particularly the nature of information maintained in database 102.

Figure 3B:
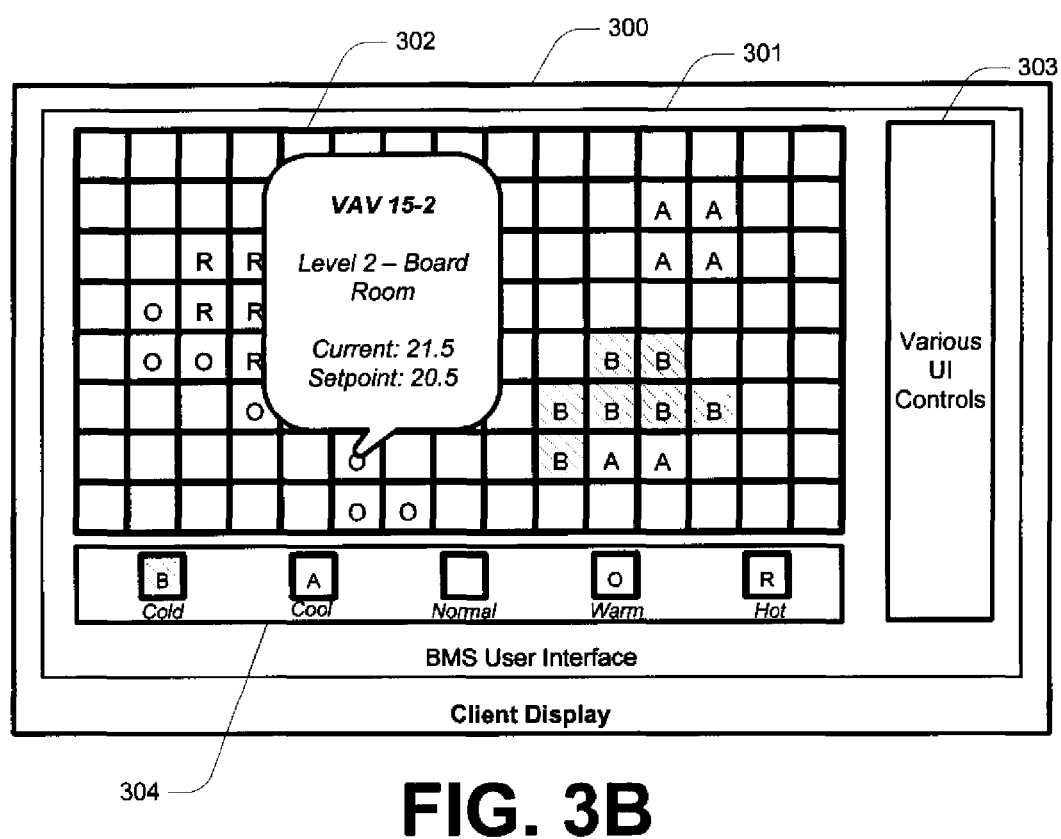
FIG. 3B schematically illustrates a screenshot showing a comfort map according to one embodiment.

In some cases the additional information is displayed as a pop-up object 310 overlying the comfort map, as shown in FIG. 3B. Object 310 indicates that the relevant ATU is called "VAV 15-2", is located on "level 2" in a "board room", has a current associated point value of 21.5, and a setpoint of 20.5. The relevant indicator block is orange thereby to indicate that comfort is warm compared to the setpoint.

Another optional functionality is to allow comfort map filtering based on various criteria, including location, equipment type, mode of operation, and so on. In some cases this triggers the generation of an additional comfort map including indicator blocks for a reduced selection of the ATUs in comfort map 302.

Although the present embodiments focus primarily on ATUs, a comfort map may also be used to show the performance of other key HVAC systems including chiller water systems and boiler systems. Similar to ATUs, each piece of equipment in these systems can be represented by an indicator block on a comfort map.

In some embodiments indicator blocks are associated with non-physical components, such as notionally defined "comfort zones". A HVAC comfort zone is a physical area in a building which is explicitly and separately controlled for heating and cooling. It resides within a single logical space in the building but may span multiple levels e.g. an Atrium. A HVAC comfort zone has one or more operating parameters (such as measured temperature, temperature set point, measured humidity, humidity set point, etc.) that together form an indication of the level of comfort for that zone. Often a HVAC comfort zone is bounded by one or more physical barriers, such as walls or partitions, but it is also possible that a HVAC comfort zone has no physical barriers. For example, a comfort zone may be defined in terms of its relationship to a HVAC system (i.e. which ATU services it) and its relationship in terms of space (i.e. which physical area or areas of the building it covers).

Modeling Spaces and Equipment in an HVAC System

In overview, some embodiments of the present invention make use of a facility model, which includes data indicative of a plurality of facility model items for describing locations in a building. The facility model items respectively describe physical locations within a building environment in terms of the category of location, and relationships with other locations. For example, facility model items may describe the likes of towers, floors, rooms, and so on. The crux of this model is to provide context in a BMS such that it inherently understand such concepts, and is able to respond to queries such as "how many rooms are there on level X" and the like.

As a general comment, the facility model organizes the physical locations of a site in a manner that produces quick maneuverability and assessment of key entities and processes. Blocks, floors, departments or sections of a site can be logically grouped to form a meaningful tree that models what the building(s) represents in real life. One key goal of a HVAC system operator is to be able to monitor and control the conditions of the building spaces. To help enable this goal the facility model should be engineered to represent the physical topology of the facility and contains a number of key entities:

Building: Each building in the facility can be represented as a single entity and contains at least one level.

Level: A level in the building encompasses an entire single horizontal space bounded by the perimeter walls of the building.

Room (optional): A room exists within a building and is a single space bounded by walls (internal or building perimeter). A room is normally created to help provide meaningful navigation of the system or for Scope of Responsibility reasons.

Area (optional): An area can exist within a level or outside the building to represent a physical space that is considered to be distinct from other areas. An area is normally created to help provide meaningful navigation of the system or for Scope of Responsibility reasons.

Modeling Equipment in an HVAC System

The equipment model includes a plurality of equipment model items that each respectively describe pieces of equipment. The manner by which they describe equipment is determined by specific standards, so as to provide context in a BMS.

In the context of this document, the term "equipment" is used to describe a mechanical device that has electrical/electronic sensors and/or actuators that control and provide feedback about the status of the device. The term can also be considered to describe a collection of smaller components that are brought together that provide a unit of control over the system of which they are a part. Examples of key HVAC equipment are boilers, chillers, air handling units, air terminal units, fans and pumps. Examples of smaller components that can also be considered equipment are the fans/fan motors, dampers, valves, coils, sensors, etc that come together to form an Air Handling Unit.

Extending from this, in the present embodiment equipment model items have the following main attributes:

Category. In the some embodiments, a standard is defined for each category of equipment in the HVAC system (for example a standard for an AHU or ATU). In some cases the standards are specific to particular pieces of unitary HVAC equipment. Each piece of equipment requires the ability to identify its type to the system. For example, each equipment item includes a custom parameter for maintaining data indicative of equipment category. This information can then be used to build reports or groups of equipment for energy management reasons.

The location of the piece of equipment, for example by reference to the facility model.

One or more data points associated with a piece of equipment belonging to that category. For example, these data points provide point values for temperature, humidity, and the like.

The roles of those data points. This provides context to the individual data point (and their point values) such that, for example, a current temperature value is able to be readily identified.

Relationships with other pieces of equipment. For example, these may be defined in terms of containment relationships (a given piece of equipment contains another, or is contained by another) and/or reliance relationships (a given piece of equipment relies upon another, or vice versa). In terms of a HVAC system, reliance relationships are defined in terms of "supply" relationships. For example, a given ATU is supplied by a specific AHU.

Other embodiments use a reduced selection of these, optionally in combination with further attributes.

Conclusions and Interpretation

It will be appreciated that the above disclosure provides improved systems and method for displaying HVAC information. For example, unlike existing operational visual displays for monitoring comfort, a comfort map is well suited to summarize a building's overall comfort on a single display. Furthermore, the comfort map may be automatically generated based on HVAC component data maintained by a BMS, for example based on an equipment or facility model. In this manner, it is independent of a building's floorplans, and can also automatically update to reflect changes in the building. As new HVAC equipment is added to a building control system, the comfort map automatically adapts to include this information in its visual calculations. This provides a significant saving on the initial commissioning cost of the display and ongoing maintenance.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for displaying information in relation to a Heating, Ventilation and Air Conditioning (HVAC) system, the method including;

obtaining data indicative of a plurality of HVAC components of an HVAC system;

defining data indicative of a display object for rendering on a client display, the display object including a grid defined by a plurality of commonly-sized geometrically arranged indicator blocks, wherein each indicator block is associated with a respective unique HVAC component;

binding each indicator block with a respective source of comfort level data for its associated HVAC component; and for each indicator block:
   (i) identifying comfort level data obtained from the source with which that block is bound, wherein the comfort level data includes a measured temperature value;
   (ii) comparing the obtained comfort level data with a predefined comfort setpoint for that block, wherein the comfort setpoint includes a predefined preferred temperature value;
   (iii) setting a display attribute for the block based on the relationship between the obtained comfort level data and the predefined comfort setpoint; and
   (iv) repeating steps (i) to (iii) thereby to, on an ongoing basis, modify the display attribute responsive to changes in the comfort level data.

2. A method according to claim 1 wherein the plurality of HVAC components include a plurality of Air Terminal Units (ATUs).

3. A method according to claim 2 wherein each indicator block is associated with a respective ATU.

4. A method according to claim 1 wherein the display characteristics visually indicate whether a region serviced by the relevant HVAC component satisfies predefined comfort parameters.

5. A method according to claim 1 wherein the display characteristics include the colour of the indicator block.

6. A method according to claim 1 wherein the display component is sized responsive to the number of HVAC components.

7. A method according to claim 1 wherein the indicator blocks are quadrangular.

8. A method according to claim 1 wherein rows in the grid represent a first HVAC system attribute and columns in the grid represent a second HVAC system attribute.

9. A method according to claim 1 wherein a given indicator block, when rendered on a client display, provides an interactive object for accessing additional information describing its associated HVAC component.

10. A method according to claim 1 wherein the source of comfort level data is a data reference in a building management system.

11. A method according to claim 10 wherein the data reference is indicative of a value derived from analysis of one or more point values associated with the relevant HVAC component.

12. A method according to claim 1 wherein the source of comfort level data is an HVAC component.

13. A method according to claim 1 wherein the comfort level data is derived from two or more measured parameters including temperature data.

14. A method according to claim 13 wherein the two or more measured parameters include humidity data.

15. A non-transitory computer readable medium containing code that, when executed on one or more processors, causes the processors to perform a method according to claim 1.

16. A computer system comprising:
a memory for storing software instructions;
a processor coupled to the memory, the processor configured to read and execute software instructions in the memory to:
obtain data indicative of a plurality of Heating, Ventilation and Air Conditioning (HVAC) components of an HVAC system;
define data indicative of a display object for rendering on a client display, the display object including a plurality of geometrically arranged indicator blocks, wherein each indicator block is associated with a respective unique HVAC component;
bind each indicator block with a respective source of comfort level data for its associated HVAC component; and
for each indicator block,
(i) identifying comfort level data obtained from the source with which that block is bound, wherein the comfort level data includes a measured value;
(ii) comparing the obtained comfort level data with a predefined comfort setpoint for that block, wherein the comfort setpoint includes a predefined preferred value;
(iii) setting a display attribute for the block based on the relationship between the obtained comfort level data and the predefined comfort setpoint; and
(iv) repeating steps (i) to (iii) thereby to, on an ongoing basis, modify the display attribute responsive to changes in the comfort level data.

* * * * *